United States Patent [19]
Clare et al.

[11] Patent Number: 6,105,231
[45] Date of Patent: *Aug. 22, 2000

[54] HIDDEN STORAGE/UTILITY SYSTEM MODULAR FABRICATION METHOD

[76] Inventors: Scott Clare, 3381 Shawn Ct.; Neil G. Long, 2630 Randall Way, both of Hayward, Calif. 94541

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,388

[22] Filed: Jul. 18, 1997

Related U.S. Application Data

[63] Continuation-in-part of application No. 08/685,678, Jul. 24, 1996, abandoned, which is a continuation-in-part of application No. 08/506,893, Jul. 26, 1995, Pat. No. 5,567,000.

[51] Int. Cl.[7] .................................................. B23P 11/00
[52] U.S. Cl. ............................................ 29/434; 29/469
[58] Field of Search ................................ 29/401.1, 434, 29/469, 897.2

[56] References Cited

U.S. PATENT DOCUMENTS

| | | | |
|---|---|---|---|
| 1,990,757 | 1/1935 | Stiles | 296/28 |
| 2,616,754 | 11/1952 | Stahl | 296/27 |
| 2,662,793 | 12/1953 | Lindsay | 296/28 |
| 2,941,837 | 6/1960 | McCready | 296/37 |
| 2,978,153 | 4/1961 | Brindle | 224/42.42 |
| 3,034,823 | 5/1962 | Himka | 296/28 |
| 3,068,038 | 12/1962 | Douglas | 296/24 |
| 3,245,713 | 4/1966 | Ogilvie | 296/24 |
| 3,541,668 | 11/1970 | Wessells et al. | 29/469 |
| 4,135,761 | 1/1979 | Ward . | |
| 4,422,685 | 12/1983 | Bonfilio et al. | 296/197 |
| 4,900,083 | 2/1990 | Kumasuka et al. | 296/197 |
| 5,090,105 | 2/1992 | DeRees | 29/469 |
| 5,303,969 | 4/1994 | Simnacher | 296/37.6 |
| 5,316,358 | 5/1994 | Payne et al. | 296/37.6 |
| 5,819,390 | 10/1998 | Clare | 29/438 |
| 5,823,598 | 10/1998 | Clare | 296/37.6 |

*Primary Examiner*—S. Thomas Hughes
*Assistant Examiner*—Steven A. Blount
*Attorney, Agent, or Firm*—L. E. Carnahan

[57] ABSTRACT

A hidden storage system incorporated in the bed of a vehicle without altering the bed's external appearance, either by assembly of individual components or modules containing various individual components. The storage system is located adjacent the wheel well sections of the bed, and uses hinges to open and close the fender/side panel of the bed, either upwardly or downwardly. Since the storage system does not alter the truck's external appearance, it reduces the attraction for theft. Also, since the storage area does not extend inwardly beyond the conventional wheel wells, the storage system leaves most of the truck bed free for use. The hidden storage system may incorporated into the bed by conversion of an existing bed as well as by an initial fabrication method.

20 Claims, 8 Drawing Sheets

HIDDEN STORAGE/UTILITY SYSTEM MODULAR FABRICATION METHOD

RELATED APPLICATION

This application is a Continuation-In-Part of U.S. application Ser. No. 08/685,678 filed Jul. 24, 1996, now abandoned which is a Continuantion-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to storage/utility beds for vehicles, such as pickup trucks, particularly to a hidden storage bed assembly method for such vehicles, and more particularly to a modular fabrication method for assembling hidden storage beds without substantially altering the external appearance of the beds.

Hereinafter, the terms "hidden storage bed (or system)", "modified vehicle bed", "modified bed", "bed with hidden storage", and "storage bed", as they pertain to applicants invention, are all used interchangeably throughout the specification. Also, the terms "sidepanel" and "modified side panel", as they pertain to applicants invention, are used interchangeably throughout the application.

Pickup and small trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pick-up truck body and/or beds have been modified to provide storage/utility space, such as exemplified by U.S. Pat. No. 4,917,430 issued Apr. 17, 1990 to M. A. Lawrence.

While these prior storage/utility arrangements have been satisfactory for their intended purpose, such are an attraction for theft as well as having an appearance of a utility bed. Thus, there has been a need for a storage system for pickup truck beds which does not alter the bed's external appearance or significantly reduce the interior size of the bed, thereby reducing the tool theft problem while providing space for hidden storage without significant reduction of the bed's carrying capacity.

This need has been filled by the invention described and claimed in above-referenced U.S. Pat. No. 5,567,000, which involves the conversion or assembly of a conventional pickup truck bed into a storage/utility bed without altering the external appearance of the bed and without significant reduction in the carrying capacity thereof. This is accomplished by providing storage adjacent the wheel well area, and along the length of the bed, and providing the fender/side panel of the bed with a hinge and latch arrangement whereby the fender/sidle panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility beds. Also, copending, U.S. application Ser. No. 08/896,392, filed Jul. 18, 1997, now U.S. Pat. No. 5,979,973, entitled Hidden Storage/Utility System and Fabrication Thereof, describes and claims modifications of the hidden storage arrangement of above-referenced U.S. Pat. No. 5,567,000.

Methods have been developed for fabrication and assembly of the hidden storage beds, as well as for conversion of a conventional pickup bed, for example, into a hidden storage bed, and such methods have been described and claimed in above-referenced copending Application Ser. No. 08/685,678 abandoned, The present invention provides another method of fabricating and/or assembling the hidden storage beds, and involves a modular approach to both the fabrication of components and assembly of the bed. It has been found that certain of the individual bed components can be fabricated together, thus eliminating the assembly of these components, and that sections of the bed can be fabricated or preassembled into modular components, whereby final assembly of the hidden storage bed can be carried out by modular assembly, thereby reducing costs of fabrication and/or assembly of the bed components.

SUMMARY OF THE INVENTION

It is an object of the present invention to provide a hidden storage system for a bed, such as a conventional pickup truck bed, without substantially altering the external appearance of the bed.

A further object of the invention is to provide a method for fabricating a vehicle bed with a hidden storage system therein.

A further object of the invention is to provide a method for fabrication/assembly of a pickup truck bed with hidden storage capability and without a significant reduction in the carrying capacity thereof.

Another object of the invention is to provide a modular method for fabricating/assembling a vehicle bed with storage capability without altering the external appearance of the bed.

Another object of the invention is to provide a modular fabrication and/or assembly method for a vehicle bed with a hidden storage system wherein at least portions of the fender/side panels of the bed are hinged to allow access to a, storage area.

Another object of the invention is to reduce theft potential from a storage/utility bed of pickup trucks, etc. using a modular fabrication/assembly method to produce hidden storage areas in the bed without substantially altering the external appearance of the bed.

Other objects and advantages of the invention will become apparent from the following description and accompanying drawings. The invention involves a hidden storage system for vehicle beds, such as pickup truck beds, that can be installed in any fleetside, flareside, stepside, etc. bed, as well as beds using dual wheel housings, without substantially altering the bed's appearance. This vehicle bed may be mounted on any size truck frame up to and above the one-ton or king-cab type truck, as well as on trailers having side panels. The hidden storage system is installed in the wheel well area of the bed, and uses hinges to open and close at least sections of one or both of the fender/side panels of the bed. The one or both fender/side panels are provided with a latching/lock mechanism. Since the hidden storage system only involves the area of bed adjacent the wheel wells, it does not significantly reduce the carrying capacity of the bed. The storage boxes for the system may extend over the wheel wells and down to the bed or may only cover the areas in front of, back of, or above the wheel wells, etc. By providing a hidden storage system for a pickup truck bed, the potential of theft therefrom is substantially reduced since the unaltered appearance of the bed's external surfaces would not lead one to a realization that it contained tools, etc. While the hidden storage system can be initially fabricated in the bed, such as on an assembly line, or existing beds can be converted to include the system, the present invention provides a method by which individual components of the bed can be fabricated and/or assembled as modules, thereby simplifying the fabrication and assembly time and thus reducing the costs associated therewith.

BRIEF DESCRIPTION OF THE DRAWINGS

The accompanying drawings, which are incorporated into and form a part of the disclosure, illustrate an embodiment of the hidden storage system and fabrication methods for producing the system and, together with the description, serve to explain the principles of the invention.

DETAILED DESCRIPTION OF THE INVENTION

The present invention involves the fabrication of a, hidden storage system for a pickup truck bed, for example, and involves a method for fabricating a bed to include the hidden system without substantially altering the external appearance of the bed, and without a significant reduction in the carrying capacity of the bed. The storage system may be fabricated from various materials including metals, fiberglass, reinforced plastics, molded compounds, and combinations thereof. While the invention is illustrated and described for fleetside or stepside versions of a pickup bed, it can be installed in any type of bed having available space, and can be installed on larger (one-ton) as well as king-cab vehicles, dual wheel pickup beds, and trailers having side panels. The present invention provides an integral hidden trunk, reduces the theft potential from storage/utility beds while maintaining vehicle appearance and increasing safety of the vehicle by hiding valued items therein. The invention utilizes lost space adjacent the wheel wells of the bed while maintaining the space between the wheel wells. As known, the space between the wheel wells of a conventional pickup truck bed is, for example, about four (4) feet and the conventional pickup truck beds have a length of up to eight (8) feet plus, wherein sheets of 8 ft. by 4 ft. material, such as plywood, etc. can be carried between the wheel wells, and camper shells, etc. can be positioned in the bed. Also, the invention utilizes lost space in conventional small or mid-size pickup beds with less than four foot width between wheel wells and less than eight foot length, and maintains the space between the wheel wells. However, the space in front and back of the wheel wells is generally considered lost space for large items until material has been stacked above the height of the wheel wells. Thus, by utilizing the area in front and/or back, and above the wheel wells as hidden storage space, the overall storage/carrying capacity of the bed is increased between the outer fender and inner fender of a stock pickup by removing the inner fender. Here, the term storage space is defined as that space in which tools, such as vices, saws, parts, etc. can be stored or mounted for use, and in which shelves can be secured for retaining such tools or parts, etc. Also, due to the length of a conventional pickup side panels, the storage area can be used for skis, golf clubs, fishing equipment, sporting goods, etc. The hinged side panels may be released similar to a car trunk release by either mechanical or electrical (remote) control.

Figure 1:
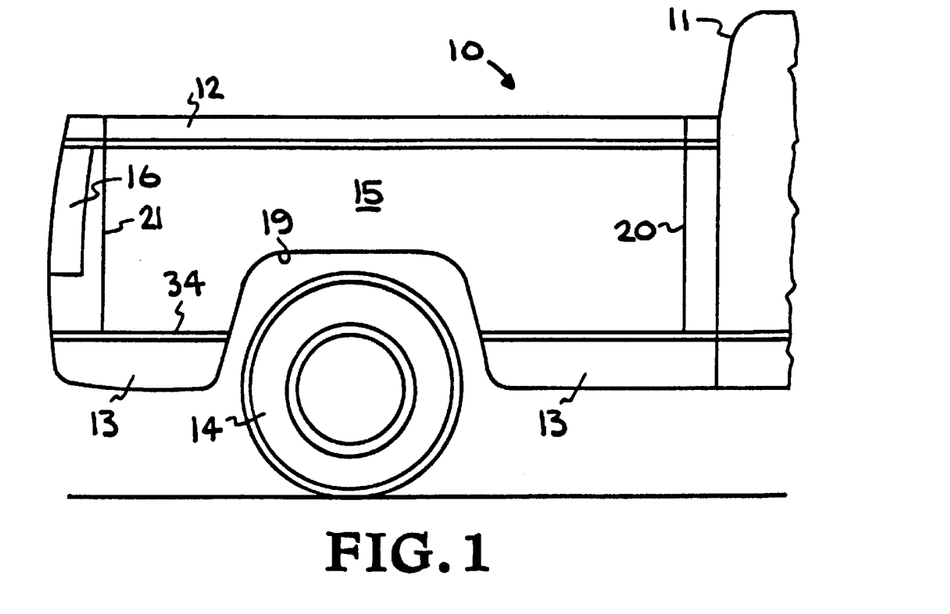
FIG. 1 is a view of a side of a pickup truck bed which has been modified to incorporate the storage system under the closed fender/side panel of the bed in accordance with the present invention.

By the present invention, a conventional pickup truck bed, for example, is initially fabricated to be a hidden storage bed, whereas the conventional installation of storage/utility beds involve the replacement of the conventional bed. Also, as set forth in the above-referenced copending application Ser. No. 08/685,678, the cost of conversion to a hidden storage bed compared the cost of the conventional bed replacement may be substantially less. Upon completion of the hidden storage system, either by initial fabrication/assembly or by conversion, from a side view, the only difference between the hidden storage bed and a conventional bed are one or more vertical lines or small spaces where the side panel is cut, as illustrated in FIG. 1, for example. In a later configuration, only one cut under the tail light is visible. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

The hidden storage system can be initially fabricated from various types of materials, as in an assembly line arrangement, wherein the various parts are initially fabricated, then assembled and painted as the bed passes from station to station along an assembly line, as described in greater detail hereinafter. Also, in accordance with the present invention, the fabrication and/or assembly of the bed can be carried out using modules containing various components of the bed. The bed and the hidden storage system may be fabricated from various suitable materials including metals, fiberglass, molded composites, plastics, etc.

Figure 2:
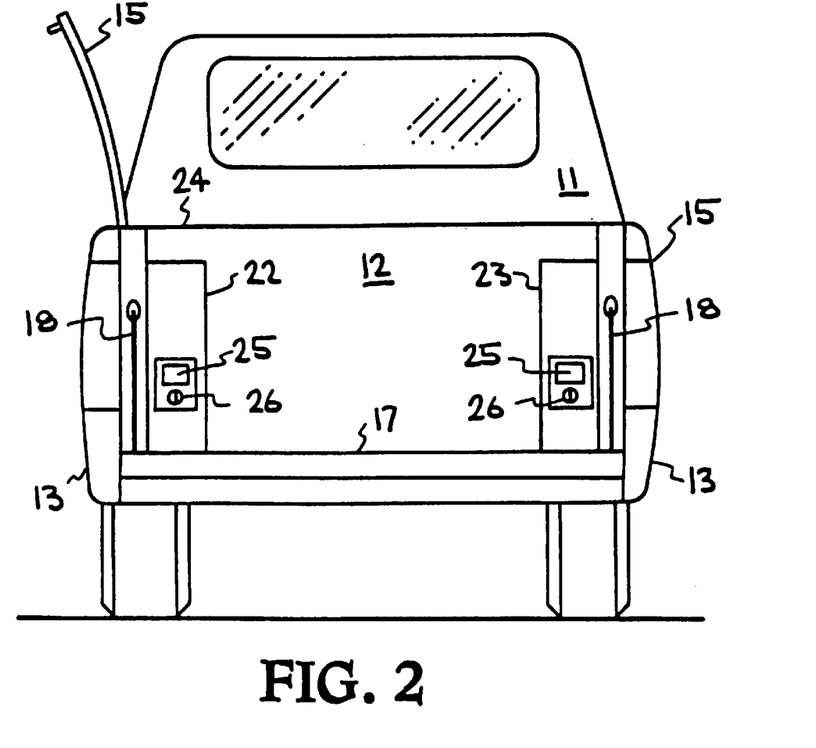
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab it, bed 12, frame or undercarriage 13, and wheels 14. The bed 12 is mounted on frame or undercarriage 13 and includes side panels 15, a tail light arrangement 16, a hinged tail gate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
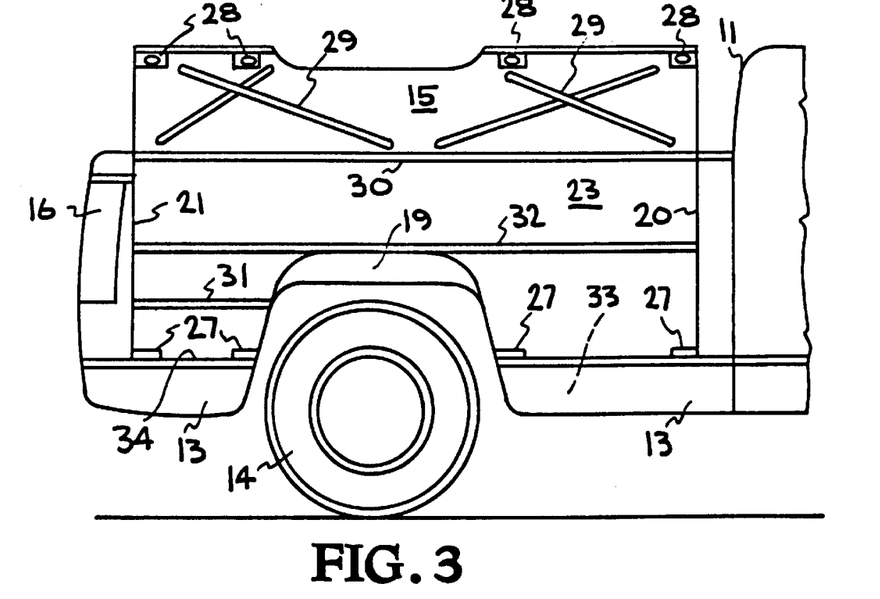
FIG. 3 is a view of an embodiment of the storage system of the FIG. 1 pickup truck bed with the fender/side panel raised to illustrate the storage bin shelves and latch mechanism.
Figure 4:
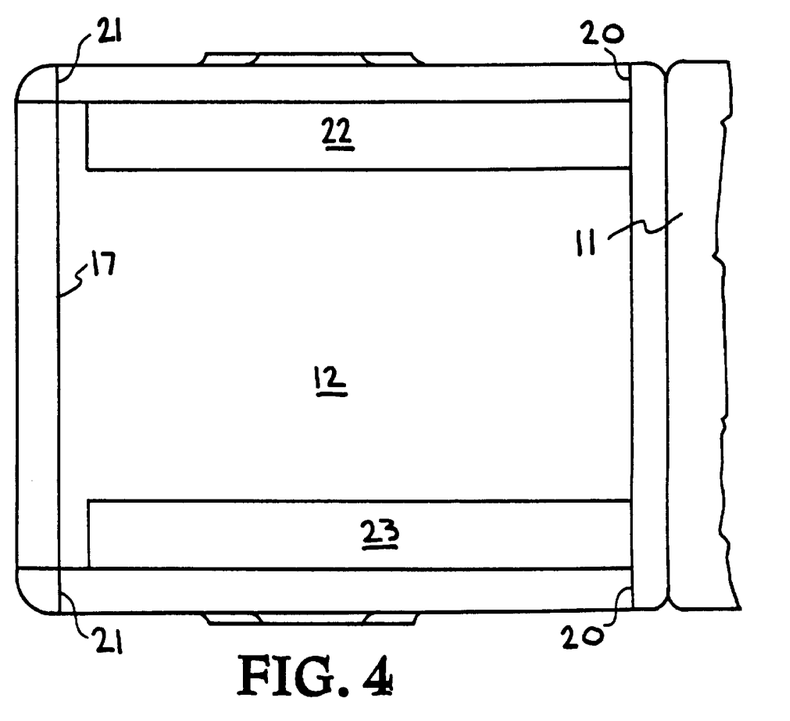
FIG. 4 is a top view of the FIG. 1 pickup truck bed illustrating the storage boxes and fender/side panels, with the tail gate closed.

As seen in FIGS. 2, 3 and 4, the hidden storage area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tail gate 17. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as shown in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms a storage bin 33. The shelves may be removable, and different combinations of shelves can be accommodated within the storage box. The hinges 30 are located on the interior of the bed 12 and thus not visible from the exterior. The hidden hinges may be of a radial swing or pantograph type, and need not extend the full length of the hinged side panel.

Figure 5:
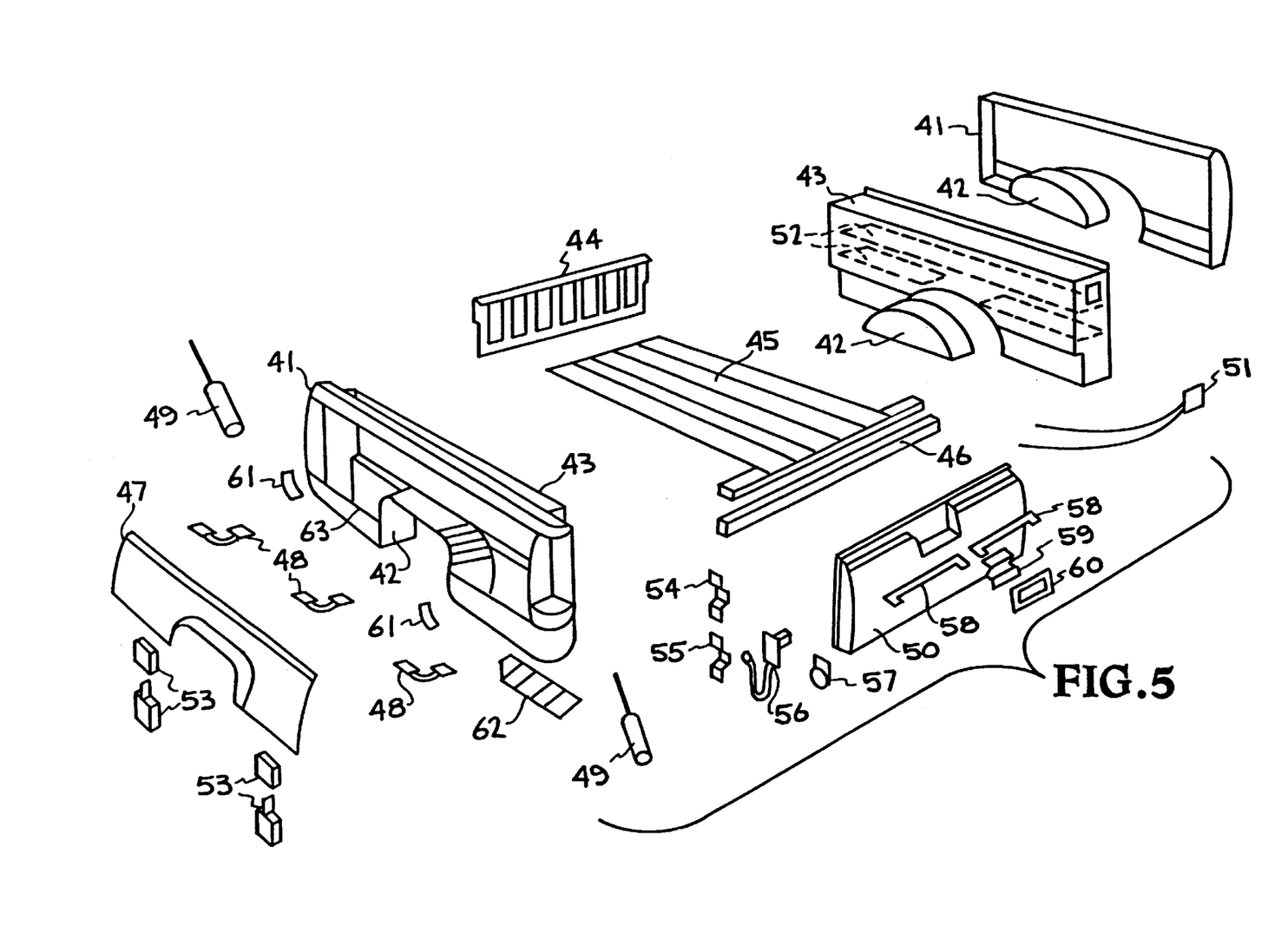
FIG. 5 is an exploded view of a fleetside or styleside light duty pickup bed incorporating the hidden storage system.

FIG. 5 illustrates in exploded view an embodiment of a fleetside or styleside version of a light duty pickup truck bed incorporating the hidden storage system, and which can be initially fabricated as a unit, or which can be formed by conversion of an existing bed. The initial fabrication process or method is described in detail hereinafter.

As shown in FIG. 5, the hidden storage system comprises side panel assemblies 41 for either a short or long bed, wheelhouse panels 42, storage housing assemblies 43 for either a short or long bed, a front panel 44, a floor panel 45 for either a short or long bed, a floor sill 46, a door panel assembly 47, door panel hinges 48, panel door gas charged shock absorbers 49, a tailgate assembly 50, a storage box handle, lock and latch assembly 51, storage shelving assemblies 52, door panel lock and latch assemblies 53, tailgate striker 54, tailgate outer hinge 55, tailgate latch and cable assembly 56, tailgate inner hinge 57, tailgate latch rods 58, tailgate handle 59, tailgate bezel handle 60, a wheel opening 61, a side panel shield 62, and a panel door gasket 63. While only one part or component is shown for simplicity in certain instances it has a corresponding component on an opposite side not shown. Different components may be fabricated from different materials, and can be manufactured using existing technology.

Figure 6:
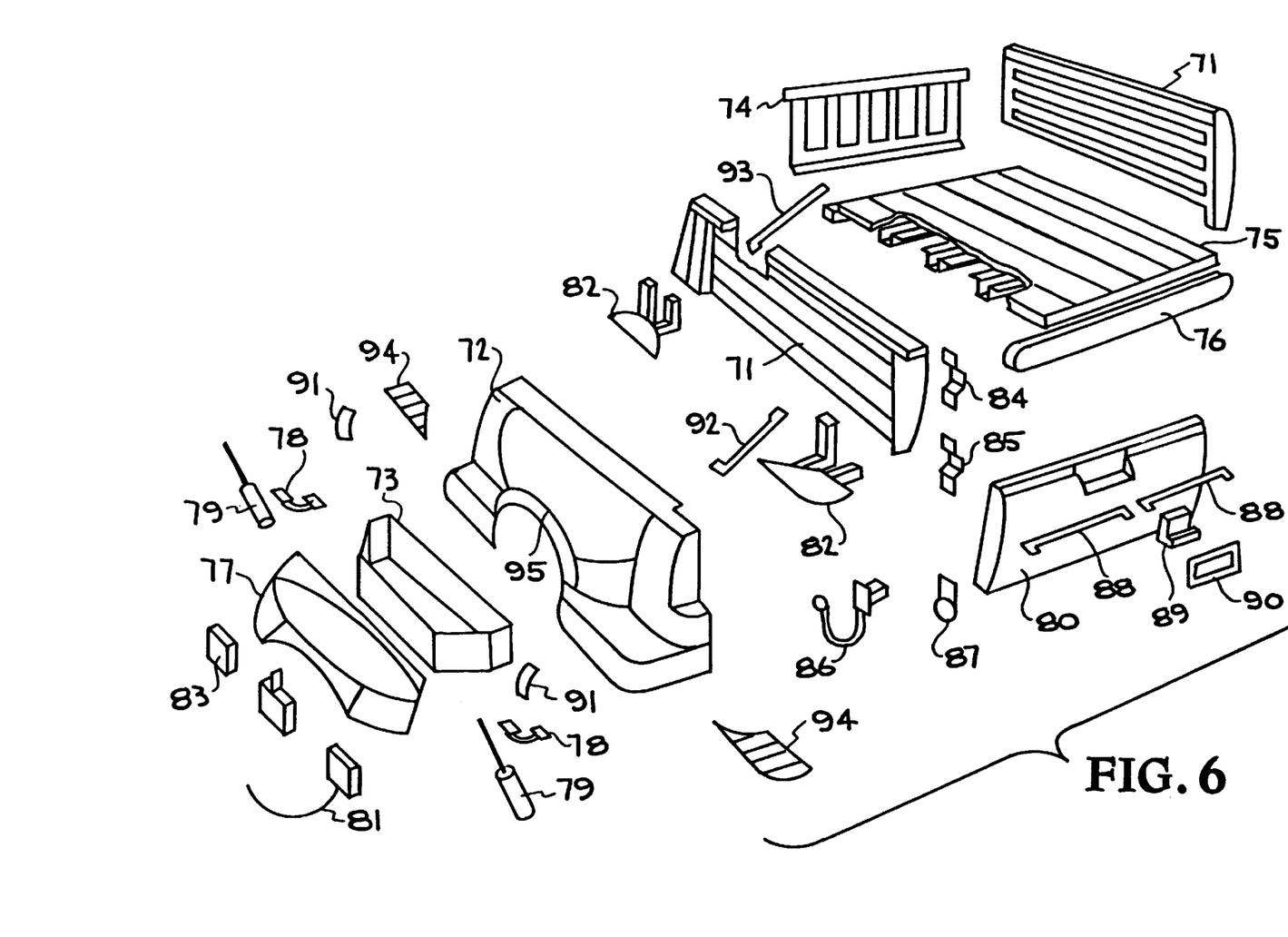
FIG. 6 is an exploded view of a stepside light duty pickup bed incorporating the hidden storage system.

As shown in FIG. 6, the hidden storage system can be incorporated into a stepside version of a light duty pickup truck bed, and comprises side panels 71 for long or short beds, fenders 72, only one shown, panel storage box assembly 73, front panel 74, floor panel 75 for long or short beds, a floor sill 76, door panel assembly 77, hidden door hinges 78, gas charged shock absorbers 79, tailgate assembly 80, latch lock and cable assembly 81, fender brackets 82, door panel lock and latch assemblies 83, tailgate striker 84, tailgate outer hinge 85, tailgate latch and cable assembly 86, inner hinge 87, latch rods 88, tailgate handle 89, bezel handle 90, wheel openings 91, fender rear brace 92, fender front brace 93, front and rear step pads 94, and door panel assembly gasket 95. While certain parts are shown singly for simplicity, corresponding parts not shown are utilized on the opposite side of the bed.

FIGS. 7–10 illustrate a modification of the framework of a conventional pickup to provide additional support for the hidden storage bed, particularly when utilizing the modular assembly method. In addition to providing additional support for the bed, the use of collapsible support members provides protection for fuel tanks which are located beneath the bed should the bed be hit from the side in a collision which would cause bending of bed support members and possible rupture of the fuel tank therebeneath. While the modification of the framework is particularly beneficial with modular assembly of the bed, the modified framework can also be utilized in beds wherein the components are assembled on an assembly line or in beds undergoing the above-referenced conversion method.

Figure 7:
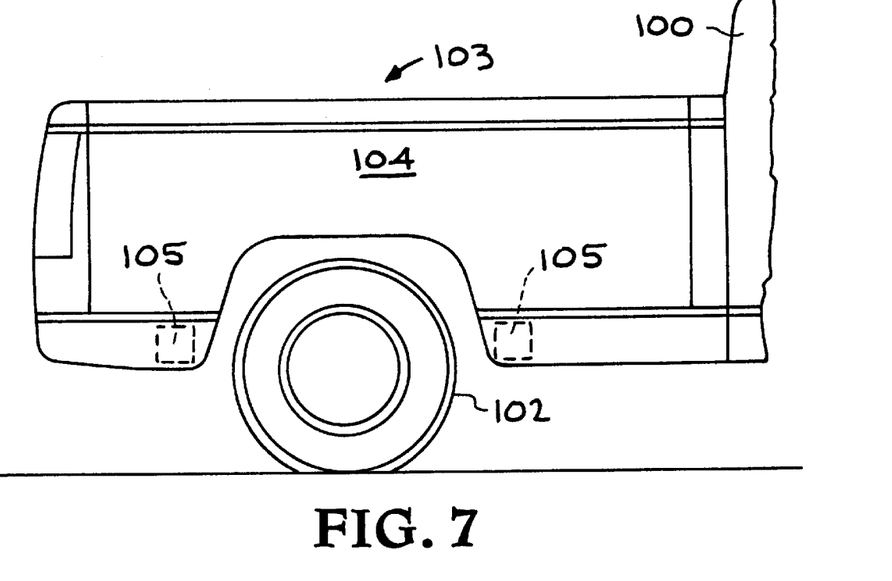
FIGS. 7–10 illustrate a collapsible support frame for the storage system which functions as a bed support and as a fuel tank protection system.
Figure 8:
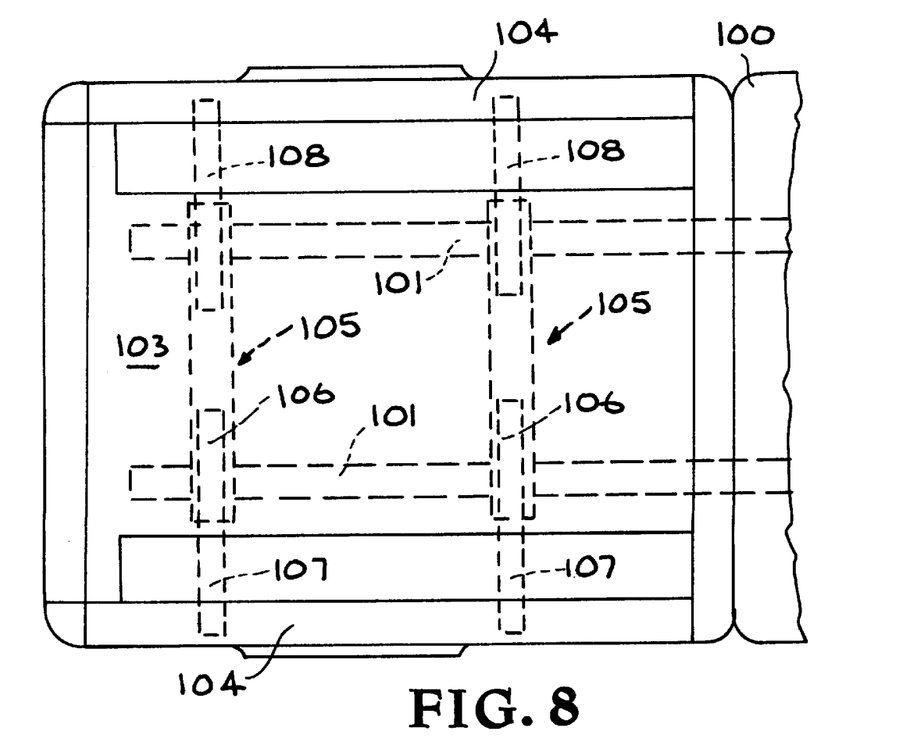
Figure 9:
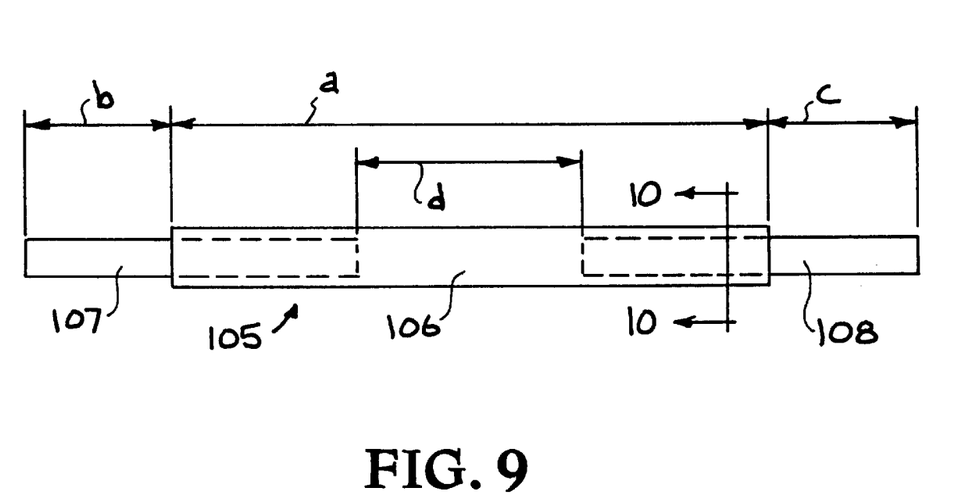
Figure 10:
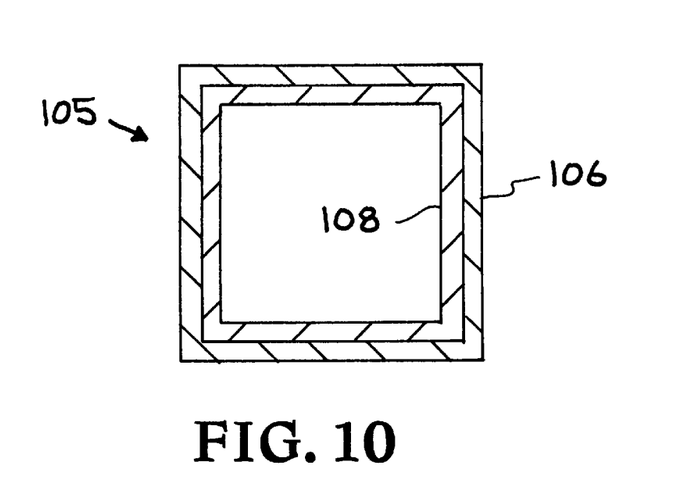

As seen in FIGS. 7 and 8, a vehicle 100, such as a pickup truck, having frame members 101, wheels 102 (only one shown) mounted on an axle, not shown, is provided with a hidden storage/utility bed 103 having side panels/fenders 104, such as illustrated in FIGS. 1–4. A pair of collapsible support beams 105 are mounted across the frame members 101 and extend outwardly so as to terminate inside the side panels/felders 104. As seen in FIG. 9, each of the collapsible support beams 105 is composed of a central section 106 and end sections 107 and 108 that are constructed to extend into central section 106, a cross-section of the central section 106 and end section 108 is illustrated in FIG. 10, as taken along the line 10—10 of FIG. 9. Beams 105 may also be rectangular, circular, etc. in configuration. As seen in FIG. 9, central section 106 of beam 105 has a length, a, while end sections 107 and 108 extend from central section 106 by a length, 1) and c, respectively, with the inner ends of end sections 107 and 108 being separated by a distance, d. The length of a, b, c and d is determined by the width of bed 103. The end sections 107 and 108 may be spot-welled, for example, at a desired point to central section 106.

The collapsible support beams 105 are constructed such that end sections 107 and/or 108 will collapse or slide into central section 106 should either of the side panels/fenders 104 be impacted. By constructing the beams 105 to be collapsible, impact causes same to collapse rather than bend such that a fuel tank mounted under bed 103 is not ruptured or punctured due to bending action of the support beams 105. Inasmuch as the bottom or floor of the bed 103 is mounted above the support beams 105, impact from the side will result in the floor bending upward, not downward due to the support beams, thus also preventing rupturing or puncturing of a fuel tank by the bed floor or support beam. Thus, in addition to supplying support for the hidden storage bed 103, the support beams 105 provide a needed safety feature by protecting the fuel tank from impact.

The invention involves a method for carrying out initial fabrication of a vehicle bed for pickup trucks, for example, which incorporates the hidden storage system. The method may be carried out via an assembly line operation as described with respect to FIGS. 5 and 6, or by a modular method as described with respect to FIGS. 11–12.

In either case, the hidden storage system is incorporated into a vehicle bed with substantially no change in the appearance of the external fender/side panel of the bed.

In addition, a conversion method, such as described in above-referenced copending application Ser. No. 08/685, 678 can be utilized to enable damaged beds or existing undamaged beds to be modified to include the hidden storage system. In the case of damaged beds, new fender/side panels and hidden storage assembly components are prefabricated in a jig system platform assembly similar to the initial fabrication method described hereinafter, but without the bed panel, front panel and tailgate assemblies, as illustrated in either of FIGS. 5 or 6. These prefabricated hidden storage system components are available for six foot, seven foot, 8 foot and larger pickup truck bed lengths, as manufactured for any light duty truck, including the dual rear-wheel and king-cab trucks.

Original Equipment Manufacturing (OEM)
Assembly Sequence:

1. The manufacturing production and assembly of the hidden storage system begins in the forming and molding fabrication section. This is accomplished by means of stamp forming sheet metal into the pickup truck bed components in hydraulic presses with accompanying dies, breaks and shears.

2. Manufacture of the hidden storage system components may also be accomplished by means utilizing SMC (Sheet Molded Compounds) composite materials in molded or sheets goods.

3. Roll or flat stock forming sheet metal (with a thin coat of forming oil) is fed into a sizing shear die or forming die, if the material is pre-cut The process continues through subsequent sizing and forming die which progressively shape the bed panels for the front end, floor, wheelhouse, exterior and interior door and tailgate. Reinforcement, bulkhead, clips and shelving components are fabricated similarly by standard of the industry techniques. Metal structural components in the bed are not substituted with SMC material, but may be integrated for attachments and reinforcements.

4. All metal components or SMC fabricated components are placed into an inventory system for final assembly. This manufacturing assembly procedure utilizes a JIT (just-in-time) parts system.

5. The final assembly of the fabricated and vendor outsourced components begin with feeding parts into a computer automated main assembly line conveyor system by means of a married computer automated spur conveyor system. Parts are fed upon demand controlled by a computer sequencer operation.

6. The basic bed structural components are conveyed to the automatic pin-fit jib robotic welding platform system which positions and locks the bed components of floor panel, front end panel, inside storage box panels, wheelhouse and tailgate bulkhead panel into a precise tolerance weld-up by means of utilizing state of the art robotic welding machines and associated platform positioning equipment.

7. The robotic welding machines retract and the jig system reverses lockup closure of the welded bed components allowing the chain conveyor to lift the bed into the next assembly sequence of bolting the pre-assembled tailgate door and hidden storage exterior door panel into the assembly held in position by means of special wire restraints to prop open the doors and tailgate for priming and final painting systems application.

8. The assembled bed proceeds into a highly illuminated booth to allow visual Q&A (quality and assurance) inspection for dolly, grinding and sandout correction of any minor surface imperfections prior to primer application. Special brazing is also accomplished at this stage in stress areas at the upper portion of the inside corners of the tailgate bulkhead.

9. After exiting the inspection arid surface correction station, the bed progresses through a deionized water spray bed paint surface conditioning booth and then continues to be conveyed into the immersion primer bath. The welded bed is primed by means of an immersion bath system. The bed enters and leaves the primer bath at inclined positions to allow entrapped primer material to quickly drain from the bed and storage compartment areas. Strategic drain holes are provided to allow excess primer material to drain from entrapped areas.

10. Primer curing is accomplished by means of conveying the bed through a heated tunnel drying booth until the temperature reaches approximately 345–350 degrees Fahrenheit for the recommended time specified by the paint manufacturer as sufficient to cure the metal protection primer coat. The bed then progresses along the conveyor allowing cooling of the bed. The bed continues to progress into a second inspection station whereby the bed is highly illuminated by means of a lighting system along the walls and ceiling soffit areas allowing visual inspection for primer coat imperfections.

11. The next station is used to accomplish manual surface sanding of any surface defect, and hand spray touch up of the areas requiring correction of any minor aberrations found in the paint film surface. Rapid paint curing of touch up areas is accelerated by utilizing an ultra violet lamp which travels with the conveyed bed for approximately 8 minutes.

12. Caulking is then strategically applied over bed fabrication seams by means of a hand held caulking gun with controlled pressure fed in a precisely controlled manner, forming a smooth caulk bead for aesthetic reasons and preventing moisture from entering the bed joints to inhibit hidden rust formation.

13. After the drying booth and visual inspection sequence, the bed continues into the final color paint booth. Paint color is pre-selected and is automatically applied by means of a robotic turbo head paint applicator onto the bed. The bed is negatively charged and the paint is positively charged. The paint precipitates onto the bed components electrostatically.

14. Paint mil thickness application, if obtained by means of controlling the application term, fluid flow and speed of the robot. Inside of corners will require hand gun touch up paint application to obtain the specified mil thickness where discreet electrostatic: precipitation deficiencies occur due to the physics inherent to automatic electrostatic paint application.

15. The bed paint drying and cure will then be processed by means of a tunnel oven which will allow temperature and time cure of the final paint coating. Heat is increased to a maximum of 345 degrees F. and slowly cooled as it progresses to the final visual inspection station.

16. The final visual quality assurance inspection is undertaken by the means of a high illumination booth. Units with surfacial imperfections in the paint are removed from the line and individually repaired manually with standard paint rub out techniques with re-coat as required. Re-coat paint cure is accelerated with an ultra violet paint lamp applied to the re-coat surface for approximately 8–10 minutes.

17. The bed continues along the assembly line conveyor through final assembly component stages whereby the tailgate and hidden storage door hardware, including strikers, latches, locks, handles, cables, hidden latch assemblies, perimeter and specialty door gaskets, storage (compartment drain check valving, wiring harnesses, tail light assemblies, shelving, shelving clips, shelving liners and manufacturing decals are manually installed or applied.

18. Final quality assurance inspection for form, fit end function is performed as the bed exits the assembly line. Special PVC plastic film is placed over bed areas subject to transport damage, and gas hatch covers to prevent opening by wind pressure.

19. The finished bed is lifted by means of a forklift and placed into a special rack designed for truck inter-model and low boy trailer shipment to stocking distributors.

Figure 11:
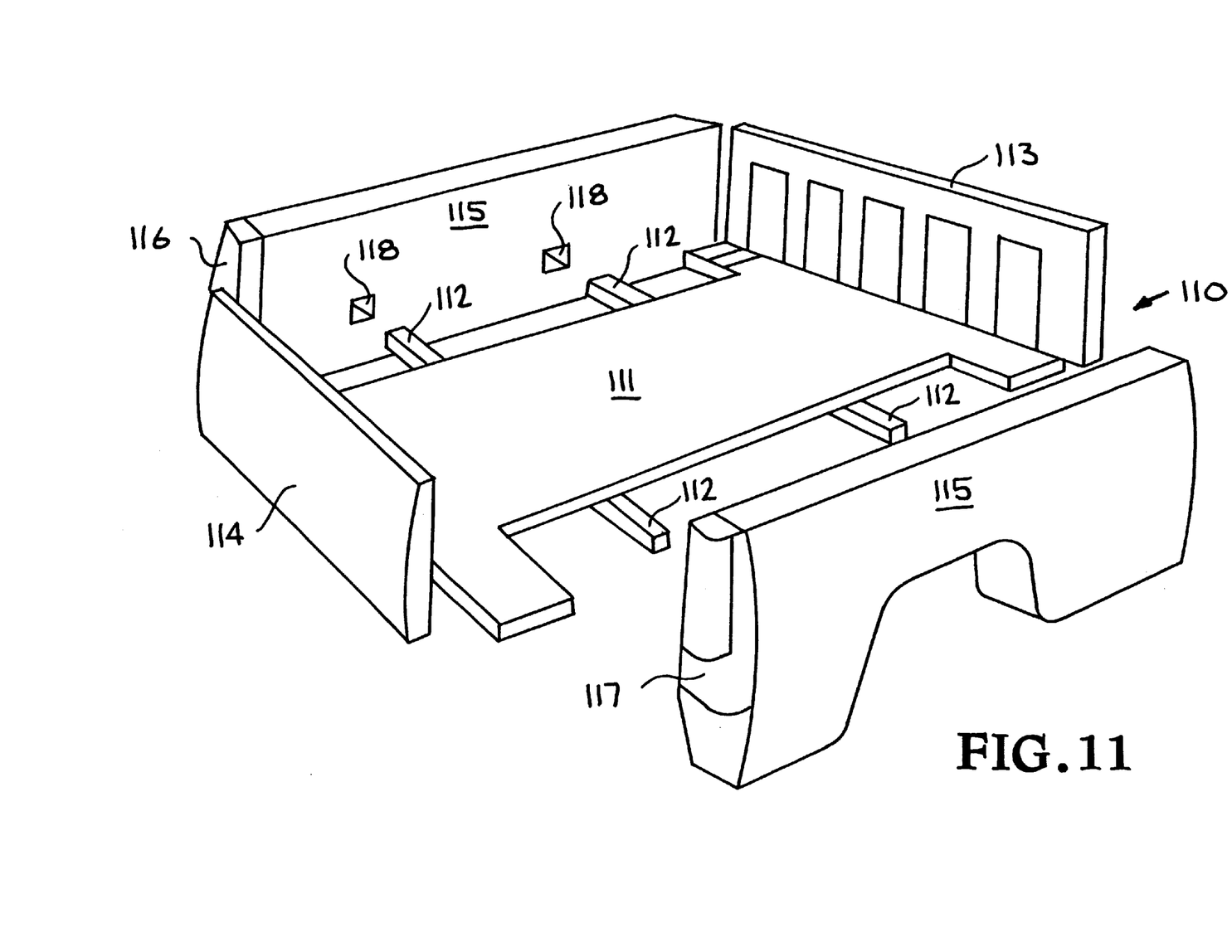
FIG. 11 illustrates a modular assembly method of the components of the hidden storage bed.

FIG. 11 illustrates an exploded view of a modular approach to the fabrication and/or assembly of a hidden storage bed utilizing the collapsible support members or beams, as described above with respect to FIGS. 7–10. As shown schematically in FIG. 11, the bed generally indicated at 110 is basically composed of five modules or assemblies comprising a floor assembly 111 to which collapsible support beams 112 are mounted or connected, a bulkhead assembly 113, a tailgate assembly 114, and a pair of side panel assemblies 115, having connected thereto tail light assemblies 116 and 117, respectively. Side panel assemblies 115 are provided with openings 118 into which collapsible support beam 112 extends, as illustrated in FIG. 8. One of the side panel assemblies 115 is shown in greater detail in FIG. 12 wherein a hinged side panel 119 thereof is illustrated in an open position and retained by a gas lift or strut 120 (only one shown).

Figure 12:
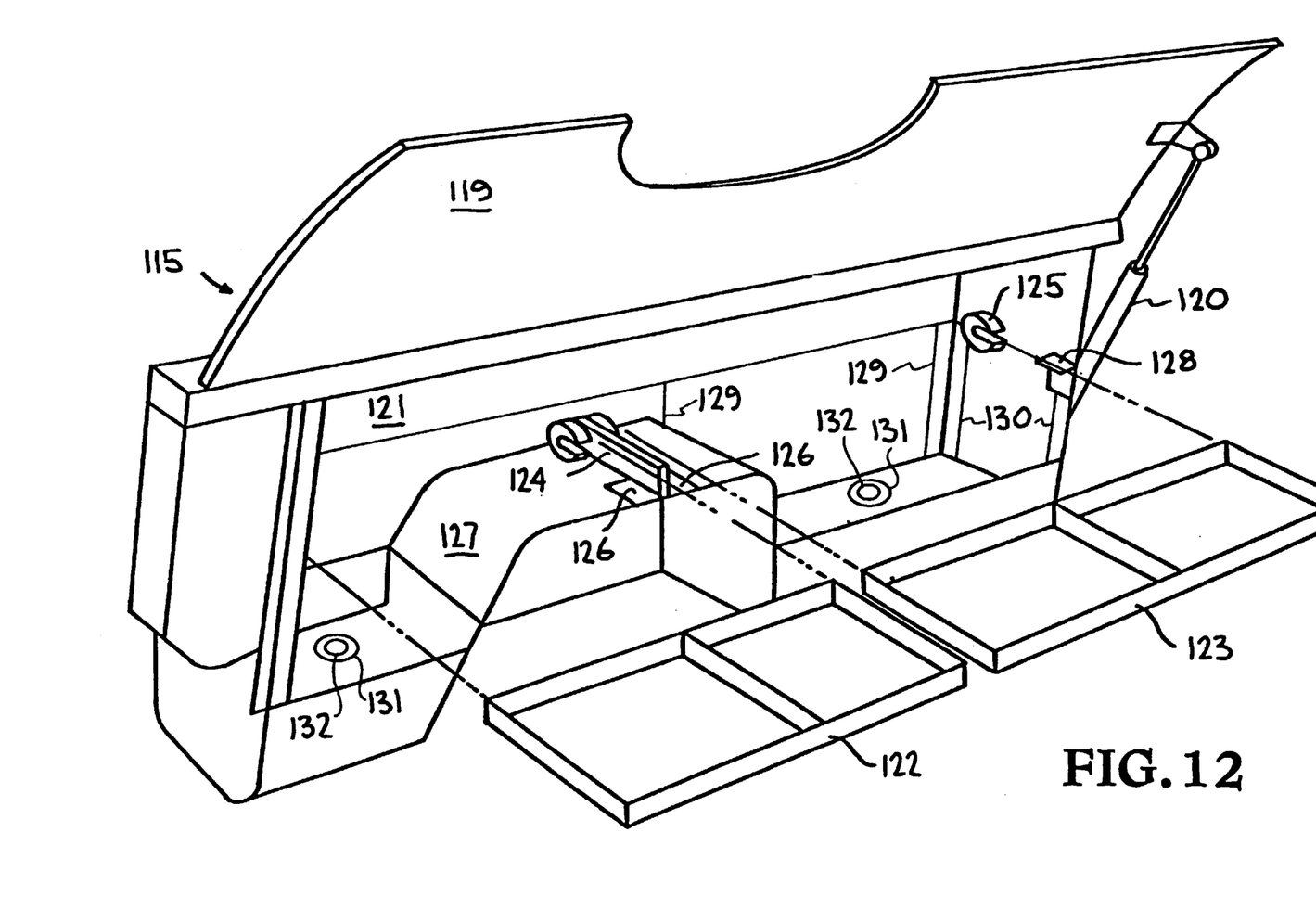
FIG. 12 illustrates a side panel assembly of Figure It showing sliding shelves mounted therein.

As seen in FIG. 12, the side panel assembly 115 additionally includes a storage box 121 into which are slideably mounted shelves or box shelves 122 and 123, which are supported by a common support member 124 and a pair of end support members 125 (only one shown). The inner ends of slideable shelves 122 and 123 slide on members 126 secured to the wheel well 127, while the outer ends of shelves 122 and 123 slide on members 128 (only one shown) secured to ends of the storage box 121. The storage box 121 may additionally be provided with adjustable shelf supports 129 and 130 on which a shelf, not shown, can be mounted whereby the height thereof can be adjusted for various uses, if desired. Support members similar to member 125 can be located at different locations in box 121 to enable the use of additional sliding shelves. The storage box 121 may also be provided with openings 131 in which are mounted drain/air relief valve assemblies indicated at 132.

Modular Manufacturing And Assembly Sequence

Utilizing conventional molding and manufacturing techniques involving various materials including metals, fiberglass and composite plastics of different types, various components can be manufactured and/or assembled in modules, whereafter the various modules are assembled to produce the hidden storage bed. One such modular assembly approach is illustrated in FIGS. 11 and 12.

As shown in FIG. 11, modular assemblies 111, 113, 114 and 115 are manufactured and/or assembled prior to these modular assemblies being secured together. Thus, the various modular assemblies 111, 113, 114 and 115 can be produced at different or at the same facility in which they are finally assembled. For example, the collapsible support beams 112 can be manufactured in one facility and forwarded to a facility where the floor assembly is manufactured and/or assembled. The bulkhead assembly 113 and tail gate assembly 114, which are conventional components, can be manufactured/assembled and shipped to the location of final assembly. The side panel assemblies 115 can be manufactured/assembled at the final assembly facility or elsewhere, and are constructed in accordance with a user's need. For example, the storage box 121 and the hinged side panel 119 may extend the entire length of floor assembly 11, as shown in FIG. 12, or the side panel and storage box may be manufactured to be located in front of or behind the wheel well. Also, the side panel 119 can be hinged along a lower end thereof, or be split either horizontally or vertically into sections which may be hinged to open either upwardly or downwardly, depending on the need of the user.

The side panel assemblies of FIG. 11 may also be manufactured/assembled to provide a desired shelf/compartment arrangement within the storage box. While FIG. 12 illustrates slideable and adjustable shelf arrangements, the shelves may extend to full length of the storage box to accommodate storage of items such as skis and ski equipment, golf bags, etc., or the storage box may be assembled to include a plurality of compartments or shelves for the storage of small parts. Thus, a potential user can order a desired shelving/compartment arrangement and such can be initially manufactured/assemble into the side panel assemblies of FIG. 11.

While not shown, the tail gate assembly and floor assembly, for example, would be manufactured/assembled to include the necessary hinges, locks and retaining mechanisms normally utilized for a conventional tail gate assembly. Also, not shown in FIG. 11 is the lock/latch mechanism for the side panels. The side panel assemblies can be secured to the floor assembly either after or prior to the attachment of the bulkhead assembly to the floor assembly. The assemblies 111, 113 and 115 call be interconnected by conventional techniques, such as welding, spot-welding, etc., whereafter the assembled bed may be painted and readied for installation on a vehicle.

It has thus been shown that the present invention provides a hidden storage arrangement that can be initially built, by either component assembly or modular assembly, into a pickup truck bed, for example, without altering the external appearance of the bed and without a significant reduction in the carrying capacity of the bed. While the invention has been described with respect to fleetside and stepside pickup beds, it can be readily incorporated into other types of pickup beds, such as the mid-size and compact, as well as in trailers or full-sized truck beds having side panels without detracting from the appearance of the side panels, except for any vertical or horizontal cuts therein. Also, the hinged fender/side panel can be hinged along the entire length whereby the entire side panel, including the tail light section, can be raised and lowered to eliminate the vertical cut lines. In addition, only sections of the side panel may be hinged, or the side panel can be hinged in sections which would require a vertical cut to allow one section to be raised. Also, a previously formed side panel can be modified by conventional restriking operations to form the hinged section thereof. Also, the entire side panel or sections can be lowered rather than raised, whereby the side panel can function as a work bench. If desired, the top rail of the bed to which the hinges are mounted may be reinforced to resist bending, such as by a resistive longer metal bend or a series of metal bends comprising a structural element.

While a specific embodiment of the storage/utility system and fabrication and/or assembly methods, along with modifications thereto of the present invention have been described and/or illustrated, such are not intended to limit the invention. For certain applications, only one storage box or plural storage boxes on one side may be desired. Beds for pickups, trailers, and trucks are designed with differently constructed side panels and frame/undercarriage arrangements. For example, the bed 12 of FIG. 1 may extend downward to cover the frame or undercarriage 13, as shown, and thus the side panels 15 would include the extended area, or a cut, such as indicated at 34 in FIG. 2, can be made along a desired lower portion of the side panels to eliminate the need for raising the entire side panel when the extended area is part thereof.

While not shown, the hinged side panel sections may be coated on the inner surfaces thereof with insulating and/or sound absorbing materials utilized conventionally in the automotive industry. Also, if desired, the internal walls of the storage boxes may be coated with similar materials. In addition, though now shown, the edges of the side panels adjacent the hinged sections are provided with seals similar to the conventional automotive trunk seals to prevent moisture and dust from entering the storage box when the hinged side panel sections are closed. Also, while the lock/latch mechanism of FIGS. 2 and 3 are of a hidden type, not visible from an external view of the bed, the mechanism may include a keyed lock mounted in a hinged side panel section, but such would detract from the hidden aspect of the storage, and thus not be desirable.

Modifications and changes may become apparent to those skilled in the art, and it is intended that the invention be limited only by the scope of the appended claims.

What is claimed is:

1. A method for fabricating a modified vehicle bed with a hidden storage area having a predetermined height located entirely within the modified bed and intermediate modified side panels defining a width of the modified bed, the width and external appearance of the modified bed being the same as that of a substantially identical conventional vehicle bed without any hidden storage area, comprising:

assembling components into a plurality of modules which together form said modified bed having said hidden storage area located entirely therein and adjacent at least one of the modified side panels of the bed, providing at least one of the modified side panels with at least one hinged section having a height substantially the same as the height of the hidden storage area, and assembling the modules to produce the modified bed with the hidden storage area located entirely therein.

2. The method of claim 1, wherein assembling the components is carried out to provide said hidden storage area adjacent each of the modified side panels of the bed.

3. The method of claim 1, wherein providing at least one of the modified side panels with at least one hinged section additionally including hinging the at least one hinged section so as to open upwardly or downwardly.

4. The method of claim 1, additionally including providing the at least one hinged section with an unexposed mechanism for retaining the at least one hinged section closed.

5. The method of claim 1, additionally including providing the hidden storage area with at least one shelf/compartment.

6. The method of claim 1, additionally including providing the modified vehicle bed with a plurality of support members having collapsible sections.

7. The method of claim 6, additionally including providing the modified side panels with openings therein into which ends of the support members extend.

8. The method of claim 1, additionally including providing at least one of the modified side panels with a plurality of hinged sections, and hinging said plurality of sections to enable movement thereof in an upward or downward direction.

9. The method of claim 1, wherein assembling the components additionally includes providing said hidden storage area with a plurality of individual compartments.

10. The method of claim 9, additionally including providing at least one of the modified side panels with a hinged section for each of the plurality of individual compartments.

11. The method of claim 10, additionally including providing means for retaining each hinged section closed.

12. A modular method for producing a modified vehicle bed having a hidden storage area located entirely therein and intermediate modified side panels defining a width of the modified bed, the width and external appearance of the modified bed being the same as that of a substantially identical conventional vehicle bed without any hidden storage area therein, comprising:

forming a floor module, forming a bulkhead module, forming a tailgate module, forming two modified side panel modules, said hidden storage area being in at least one of said side panel modules and having the same external appearance as that of a conventional vehicle, forming at least one hinged section in said at least one of said modified side panel modules having a height of at least the height of the hidden storage area, providing an unexposed mechanism for retaining the at least one hinged section closed, and assembling the formed modules into said modified vehicle bed having the hidden storage area located entirely therein.

13. The modular method or claim 12, wherein forming the floor module includes providing a plurality of support beams having collapsible sections.

14. The modular method of claim 13, wherein forming the two modified side panel modules includes providing openings therein into which ends of the support beams extend.

15. The modular method of claim 12, wherein providing the unexposed mechanism for retaining the at least one hinged section closed is carried out by providing an unexposed lock/latch mechanism for the at least one hinged section.

16. The modular method of claim 12, additionally including providing said hidden storage area with a plurality of individual compartments.

17. The modular method of claim 16, additionally including forming a hinged section in said at least one modified side panel module for each of the plurality of individual compartments.

18. The modular method of claim 16, additionally including forming at least one shelf in at least one of the plurality of individual compartments.

19. The modular method of claim 12, additionally including forming said hidden storage area to include at least one shelf or compartment therein.

20. The modular method of claim 12, wherein forming at least one hinged section in said at least one modified side panel module additionally includes hinging the at least one section to open outwardly and either downwardly or upwardly.

* * * * *